United States Patent
Ludford

(10) Patent No.: US 6,633,639 B1
(45) Date of Patent: Oct. 14, 2003

(54) TELEPHONE SWITCH CONFIGURATION DETECTOR

(75) Inventor: James Donald Ludford, Eden Prairie, MN (US)

(73) Assignee: Nortel Networks Limited, Montreal (CA)

(*) Notice: Subject to any disclaimer, the term of this patent is extended or adjusted under 35 U.S.C. 154(b) by 0 days.

(21) Appl. No.: 09/001,019

(22) Filed: Dec. 30, 1997

(51) Int. Cl.[7] .............................................. H04M 3/00
(52) U.S. Cl. ..................... 379/244; 379/243; 379/93.01; 379/93.08; 379/93.09; 379/93.11; 379/26.01; 379/399.01
(58) Field of Search ........................... 379/92.01, 92.04, 379/93.01, 93.05, 93.06, 93.09, 93.11, 399.01, 93.07, 93.08, 26.01

(56) References Cited

U.S. PATENT DOCUMENTS

| | | | | |
|---|---|---|---|---|
| 4,338,495 A | * | 7/1982 | Bloch et al. ................. | 379/158 |
| 5,048,076 A | * | 9/1991 | Maurer et al. ............ | 379/93.11 |
| 5,255,264 A | * | 10/1993 | Cotton et al. ................ | 370/286 |
| 5,349,579 A | * | 9/1994 | Madonna et al. ............ | 370/259 |
| 5,404,400 A | * | 4/1995 | Hamilton ...................... | 379/386 |
| 5,450,486 A | * | 9/1995 | Maas et al. ............. | 379/399.01 |
| 5,479,498 A | * | 12/1995 | Brandman et al. .......... | 379/283 |
| 5,513,179 A | * | 4/1996 | Maas et al. .................. | 370/359 |
| 5,661,785 A | * | 8/1997 | Carpenter et al. ........ | 379/93.15 |
| 5,898,761 A | * | 4/1999 | McHale et al. .......... | 379/93.01 |
| 6,067,316 A | * | 5/2000 | Amrany et al. ............. | 375/220 |
| 6,072,794 A | * | 6/2000 | Kang .......................... | 370/352 |
| 6,128,293 A | * | 10/2000 | Pfeffer ........................ | 370/359 |
| 6,229,814 B1 | * | 5/2001 | McMillian et al. ......... | 370/420 |

FOREIGN PATENT DOCUMENTS

GB   2 168 876 A   *  6/1986

* cited by examiner

Primary Examiner—Ahmad Matar
Assistant Examiner—Bing Bui
(74) Attorney, Agent, or Firm—Schwegman, Lundberg, Woessner & Kluth, P.A.

(57) ABSTRACT

A telephony device such as a digital telephone or personal computer attaches to phone lines and automatically determines both the type of switch to which is connected, and the type of line card in the switch providing that connection. In addition, device functions and data types supported by the switch and line card are automatically determined, providing a fully automatically configurable device. Programming in the device monitors polling messages provided by the switch and line card having different formats to make the determination. The devices switch between two different flow control types supported by the different line cards, while listening for the polling messages. If a message is not received while using a first flow control type, the second is used. The capability of channel, voice or data, is also automatically determined once the switch type is known.

15 Claims, 9 Drawing Sheets

MESSAGE A
(X.11 A1-01-06=M1 KEYMAP DOWNLOAD)
1111 0LLL |0100 0010|0000 0001|0000 0110|WWWW WWWW|XXXX XXXX|YYYY YYYY|ZZZZ ZZZZ

| VALID LLL | VALID DATA FIELD |
|---|---|
| 011 | W |
| 100 | WX |
| 101 | WXY |
| 110 | WXYZ |

FIG. 5C

MESSAGE B
(X.11 A1-01-08=SL100 KEYMAP DOWNLOAD START)
1111 0LLL |0100 0010|0000 0001|0000 0100| VVV VVV |WWWW WWWW|XXXX XXXX| YYYY YYYY |ZZZZ ZZZZ

| VALID LLL | VALID DATA FIELDS |
|---|---|
| 011 | V |
| 100 | VW |
| 101 | VWX |
| 110 | VWXY |
| 111 | VWXYZ |

FIG. 5D

MESSAGE C
(X.11 c2=CONTINUATION WITH DATA)
1111 0LLL | 0100 0011 | TTTT TTTT | UUUU UUUU | VVV VVV | WWWW WWWW | XXXX XXXX | YYYY YYYY | ZZZZ ZZZZ

| VALID LLL | VALID DATA FIELDS |
|-----------|-------------------|
| 001 | T |
| 010 | TU |
| 011 | TUV |
| 100 | TUVW |
| 101 | TUVWX |
| 110 | TUVWXY |
| 111 | TUVWXYZ |

FIG. 5E

MESSAGE D
(X.11 A1–06=CONTINUATION END WITH DATA)
1111 0010 | 0100 0000 | 0000 0110 | ZZZZ ZZZZ

VALID DATA FIELD
Z

FIG. 5F

DTM KEY
0111 1111

FIG. 5G

TELEPHONE SWITCH CONFIGURATION DETECTOR

FIELD OF THE INVENTION

The present invention relates to telephone switches, and in particular to the attachment of devices to telephone switches and proper configuration of such devices.

BACKGROUND OF THE INVENTION

Telephone switches are used to connect devices and to connect multiple devices together so that they can exchange information. The most common form of device is a telephone. The switches allow users of the telephones to talk to each other by connecting them via various communications lines. Private switches are used in many buildings to make connections between devices attached to the same switch, and to provide external connections to other switches outside the building. There are many different types of switches, and each talk to the devices in different ways. Most new switches are digital in nature, and require the device to "talk" to it with a predetermined bit pattern. The bit pattern may be different for each switch. In addition, each switch may be configured with multiple electronic circuit cards containing connectors for making the actual connection to wires attached to the device. When wiring a building to provide this communication line between the devices and the switches, the technician had to know what type of switch each device was connected to, and the type of card in the switch. The devices either had to be a certain type, or had to have software loaded into them so they could both understand the bit stream provided by the card in the switch, and so that they could respond with the proper bit stream.

With potentially thousands of telephones coupled to a single switch, and many different lines, it was difficult to keep track of what switch and card was attached to what wire. The configuration of the switch and line card had to be manually looked up, and then manually entered into the attaching device. There was much room for error. When error occurred, the device was not able to be used until it was corrected. In some instances, a device configuration program would query a user, or installer for line specific data. The user/installer would then ask a telecom administrator for the corresponding information, usually in person, or through the use of a separate, already working telephone. The telecom administrator would then have to log into the switch and run a few administration programs to look up the line configuration data. This data would then be conveyed back to the user/installer, who would have to manually enter the data into some type of user interface of the configuration program for the device. For devices, such as a digital telephone, this could involve a sequence of touchpad keys that usually had no obvious logical significance, leading to potential error.

There is a need to simplify the connecting of telephones and other digital devices to switches. There is a need for a simple way of connecting devices to phone lines without requiring detailed knowledge of the switch and card. There is a need for further determining the proper format of digital bit stream with which to communicate with the switch without such detailed knowledge. There is yet a further need to easily determine the capabilities of the phone lines to which devices are connected without prior detailed knowledge of the configuration of the switch.

SUMMARY

A device that attaches to phone lines automatically determines both the type of switch to which is connected, and the type of line card in the switch providing that connection. In addition, device functions and data types supported by the switch and line card are automatically determined, providing a fully automatically configurable device.

In one embodiment of the invention, the device contains programming that monitors polling messages provided by the switch and line card. The polling messages from the different combinations of switches and line cards each have the same information content. However, the polling messages from each potential combination of switch and line card have a slightly different format, which the device uses to identify the switch and line card to which it is attached. The devices switch between two different flow control types supported by the different line cards, while listening for the polling messages. If a message is not received while using a first flow control type, the second is used.

The type of data that the phone lines carry is automatically determined by either knowing that one particular switch and line card provide voice and data on both lines of a connection, or by prompting the switch for a keymap download on each line. The type of keymap download received, such as one containing a DTM key, indicates that both voice and data may be transmitted and received. If no DTM key is received, each line defaults to a predetermined one of voice or data.

Automatically configuring devices without need for complex and error prone installation greatly simplifies and speeds up accurate installation of devices in a switched network. Further, it provides the ability to take full advantage of all the functions supported by the switch to which devices are connected. Third parties can also easily design devices for attaching automatically to the switches.

DESCRIPTION OF THE FIGURES

FIG. 5C is key map representation of a message used in the flow chart of FIGS. 5A and 5B.

FIG. 5D is key map representation of a further message used in the flow chart of FIGS. 5A and 5B.

FIG. 5E is key map representation of a further message used in the flow chart of FIGS. 5A and 5B.

FIG. 5F is key map representation of a further message used in the flow chart of FIGS. 5A and 5B.

FIG. 5G is a key map representation of a DTM key identifier used in the flow chart of FIGS. 5A and 5B.

DETAILED DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present invention. The following detailed description is, therefore, not to be taken in a limiting sense, and the scope of the present invention is defined by the appended claims.

Numbering in the Figures is usually done with the hundreds and thousands digits corresponding to the figure number, with the exception that the same components may appear in multiple figures.

Figure 1:
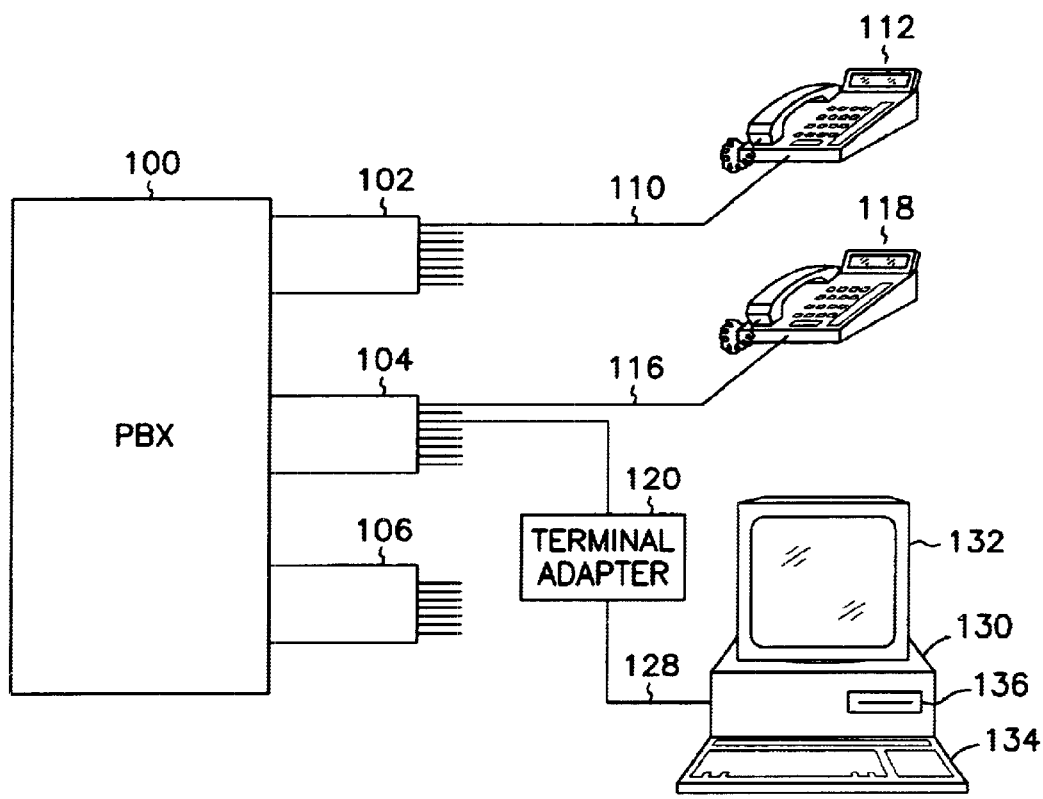
FIG. 1 is a block diagram of a switch having several devices attached.
Figure 2:
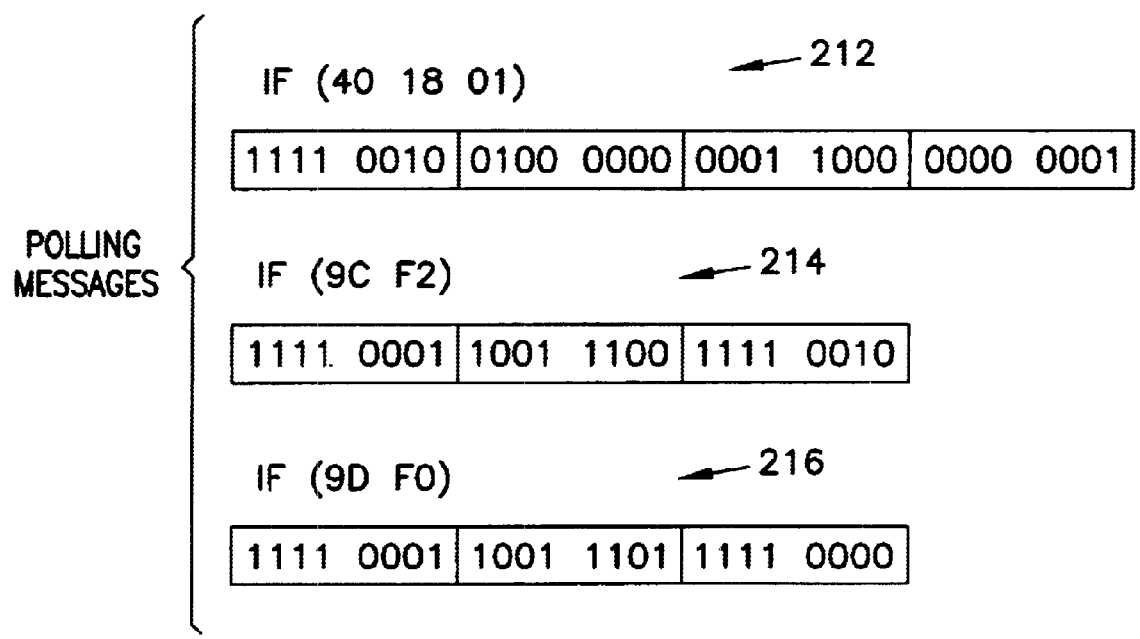
FIG. 2 is a block diagram showing the format of polling messages from various switches of FIG. 1.
Figure 3:
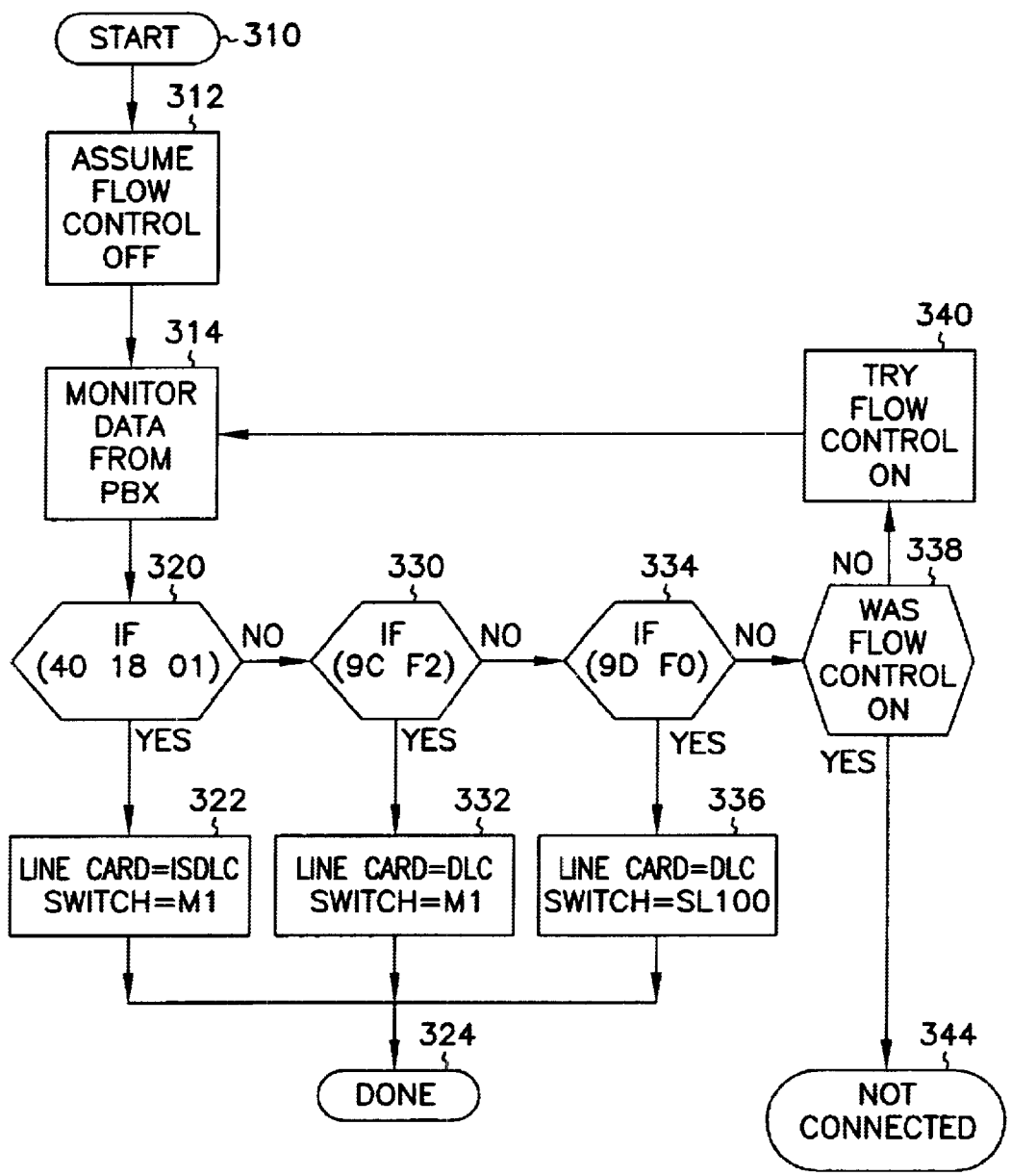
FIG. 3 is a flow chart showing steps performed by a device of FIG. 1 to identify the switch and a line card.
Figure 4:
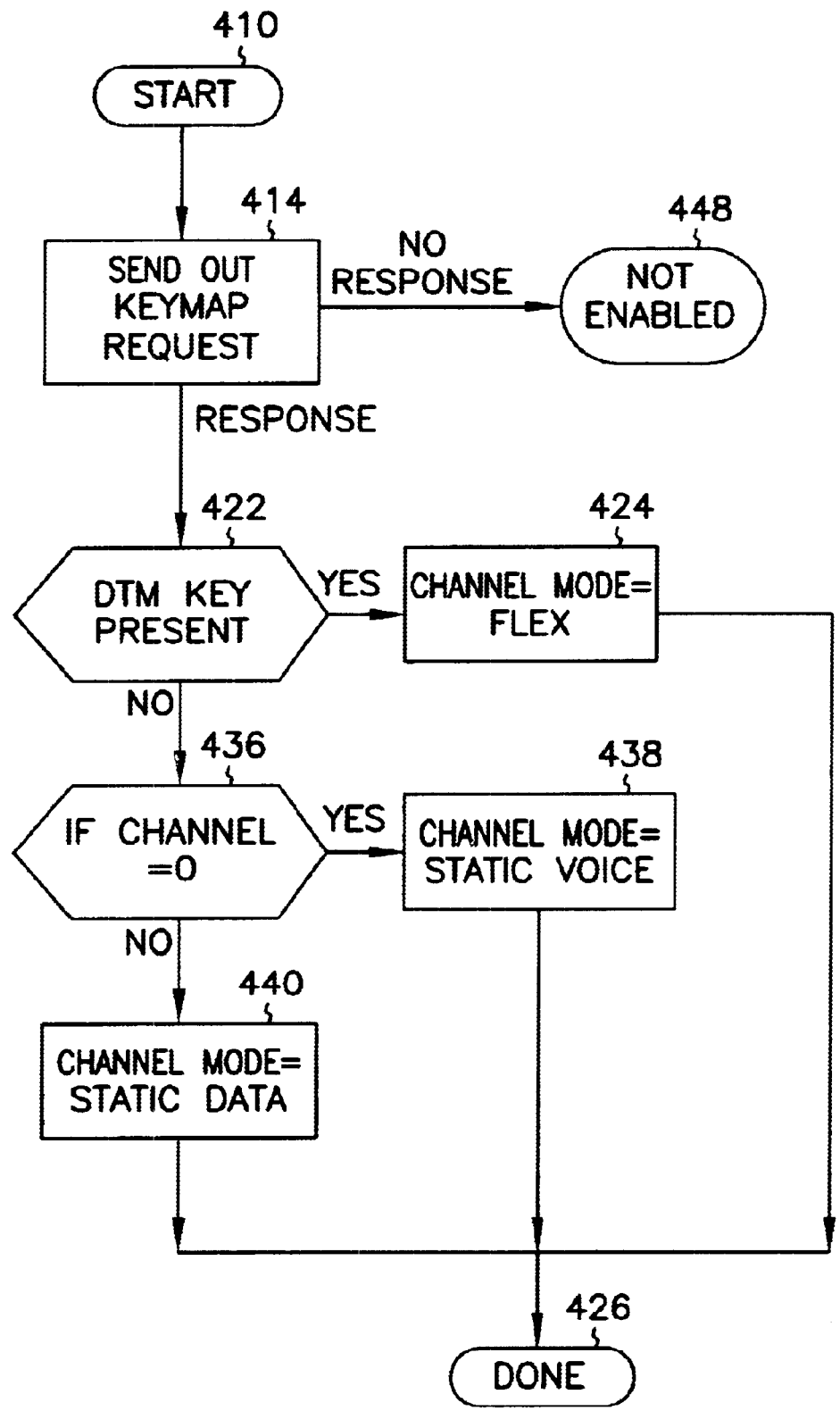
FIG. 4 is a flow chart showing steps performed by a device of FIG. 1 to identify channel modes.

The invention will be described with reference to FIGS. 1–6. FIG. 1 is used to show a telephone switch or private branch exchange (PBX) and the types of devices that are normally attached to it. FIG. 2 shows some specific polling data used by each device to automatically configure itself to properly communicate with the switch, and FIGS. 3 and 4 are used to describe how programming within each device accomplishes the automatic configuration. FIGS. 5A–F depict an alternative method of identifying channel modes.

A switch is shown at 100 in FIG. 1. The switch may be one of several that are currently available, or future switches that are compatible with the present invention. In one embodiment, the switch is either an M1 (Merridian 1) or an SL100, both manufactured and sold by Northern Telecom Ltd of Montreal Canada, the original assignee of the present invention. The switch has a plurality of line cards, 102, 104 and 106 coupled to it for providing a hardware level interface into standard telephone lines. Each line card is either a QPC578 (ISDLC) or an NT8D02 (DLC), which are part number identifiers for line cards provided by the original assignee of the present invention. Future line cards may also be used. Further, line cards may be used with other switches which are compatible, and such combinations may also take advantage of the present invention. Each line card has connectors for either 8, 16 or 32 pairs of standard telephone wires over which multiple logical channels of information comprising voice and data are provided.

Line card 102 is coupled via a pair of telephone wires represented by line 110 to a digital telephone device 112 using standard connectors. Line card 104 is coupled via wires represented by line 116 to a more fully featured digital telephone as represented at 118. Further, line card 104 is coupled via telephone wires represented by line 128 through a terminal adapter 120 to a personal computer 130 having a monitor 132 and keyboard 134 coupled thereto. Further, computer 130 is shown with a slot 136 for accepting suitable computer readable medium, such as CD, magnetic disk or tape for example. Personal computer 130 comprises any type of computer suitably configured with telecommunication features including an electronics card with associated driver module or set of modules for attaching to digital switch equipment. Terminal adapter 120 may be either a stand alone device, or an electronics card incorporated in a housing of computer 130. It is understood by those skilled in the art that code modules comprising computer programming code may be stored anywhere in RAM or similar computer readable medium accessible to the computer 130.

Similarly, telephone devices 112 and 118 contain a C84 ASIC chip or equivalent device which is configured for interfacing with multiple combinations of switches and line cards. The chip samples the lines and pulls out desired bits. In the current embodiment, the phone lines comprise 2 64 Kbit bearer channels having 2×8 Kbit signaling channels, referred to as a TCM line. It is similar to an ISDN line, and the teaching herein is equally applicable to use on an ISDN line. Telephone device 112 would typically only receive voice communications over channel 0.

Switch 100 periodically sends out streams of multiple bytes of data once a device is detected as connected to a line. The data is referred to as a polling message, and is sent out every 500 milliseconds or so depending on how busy the switch is. Each different type of switch does not send out information identifying itself, so the problem of determining the type of switch a device is attached to is not a trivial matter. The polling message provided by the switch is further modified by the type of card that connects the switch to the telephone lines. This further complicates the matter. Yet further, one of the 64 Kbit channels in some switches is a voice channel, and the other is a data channel, and sometimes both channels are voice or both are data channels. Some forms of echo cancellation would turn transmitted data on a data channel into garbage, yet is required on the voice channel to reduce any echo the caller might hear from the caller's own voice due to varying impedance terminations in the telephone lines. One must know the channel type in order to correctly handle the information on it. Again, the switch does not identify if it has the capability to handle voice or data on each channel.

Phones, such as device 112 look only at channel 0 because they only need to typically deal with voice. This same capability is provided for computer 130 through the use of a Merridian Communications Adapter as shown at 120 which only handles data, and so only looks at channel 1, or a Nortel Communicator Card provided inside computer 130. A Nortel Communicator, on the other hand has both voice and data capability and looks at both channels.

FIG. 2 shows examples of polling messages at 212, 214 and 216 that are sent out by the switches as modified by the line cards. Both the hexadecimal and binary representations are provided. As indicated, there is no express unique switch and card identifier contained in the polling messages. Rather, each polling message contains similar information, but is formatted differently by each combination of switch and line card. Knowing the differences led to the creation of a method of determining the combination by dissecting the message as shown in FIG. 3 and FIG. 4. The polling messages are shown in blocks, each block representing one byte of information. The first byte is a header, having four sync bits, each of which are indicated as "1s", and add bit, and three length bits specifying the length of the remaining poll message. The remaining bytes of the messages will be discussed below with respect to use of them in detecting the switch and line card type.

In FIG. 3, upon a switch detecting the attachment or connection of a device to a line card, the switch starts sending polling messages. The polling messages could in the alternative always be attempted to be sent. When connected, the device, through software stored on computer readable medium, or via functions implemented in hardware, ASIC, DSP or combination of hardware and software starts a line card and switch identification process at 310. Flow control is assumed to be off at 312. Flow control is performed at a number of blocks, and is determined by a parameter used to route data received on the telephone lines to different processing portions of the device for processing, such as circuitry any or combinations of circuitry and software commonly referred to as modules. Only one path at a time is utilized to prevent conflicts. Following selection of the path, data from the switch is monitored at 314 and then compared at a number of comparator blocks. If a header portion of a polling message, such as the first three blocks of message 310 are equal to (40 18 01), the line card is known to be and ISDLC card and the switch is an M1 switch as determined at 322. The process then ends at 324. If a (9C F2) is detected at 330, the line card is a DLC and the switch is an M1 as determined at 332, and again the process is terminated. If a (9D F0) is detected at 334, the line card is a DLC and the switch is an SL100. If none of the identified header portions is detected, and flow control was off as indicated at 338, flow control is set on at 340, and switch data is monitored again at 314. Again, header portions are identified and compared, and line cards and switches identified. If again none were identified, and flow control was on as determined at 338, the device determines that it is not connected at 344 and may send a message to a user on a display or provide some other indicator that it determined it was not connected.

In the above manner, the device is able to automatically determine its switch type and line card type by cycling through different potential configurations, and recognizing formatting differences in polling messages that are caused by interaction of the switches and line cards. No user interaction is required. No telecom operator need be called, and further, there was no concerted effort required by the switch maker to overtly provide fields of data to identify the combination of switch and line card.

There still remains the need to identify the capabilities of the switch. In FIG. 4, the device starts a channel mode identification process at 410. This process may be implemented in one of many ways as identified with reference to FIG. 3. At 414, messages or commands are transmitted to the switch, to ask it to respond with what keys are assigned to the device. In other words, these messages are used to determine which keys/functions can be serviced by the switch for this particular device. The functions typically are standard telephony functions, such as multiple lines, call forwarding, transfer and conference calling to name a few. It is important that the type of switch is known at this point, because different switches will provide sub responses with different numbers of keys per subresponse. In response to message 414 are key mappings shown in FIGS. 5C–5F. If a specific key (FIG. 5G) is found at 422, the channel is flexible as indicated at 424 and the process ends at 426. A flexible channel mode means that the switch supports both data and voice on a particular channel.

If no DTM key is found, and if the Channel it was received on was zero as indicated at 436, then the channel mode is set to static voice at 438 and the process is terminated. If at 436, the channel is not zero, the channel mode is set to static data at 440.

If no response is received, block 448 indicates that the device is not enabled yet at the switch. At this point, a user may have to contact the telcom operator to enable the device on the switch. If the time has not expired, a further response is waited for at block 416.

By simply checking the functionality supported, in addition to knowing the type of switch, the above process provides the ability of an attached device to automatically determine which channels support voice, data, or both.

Figure 5A:
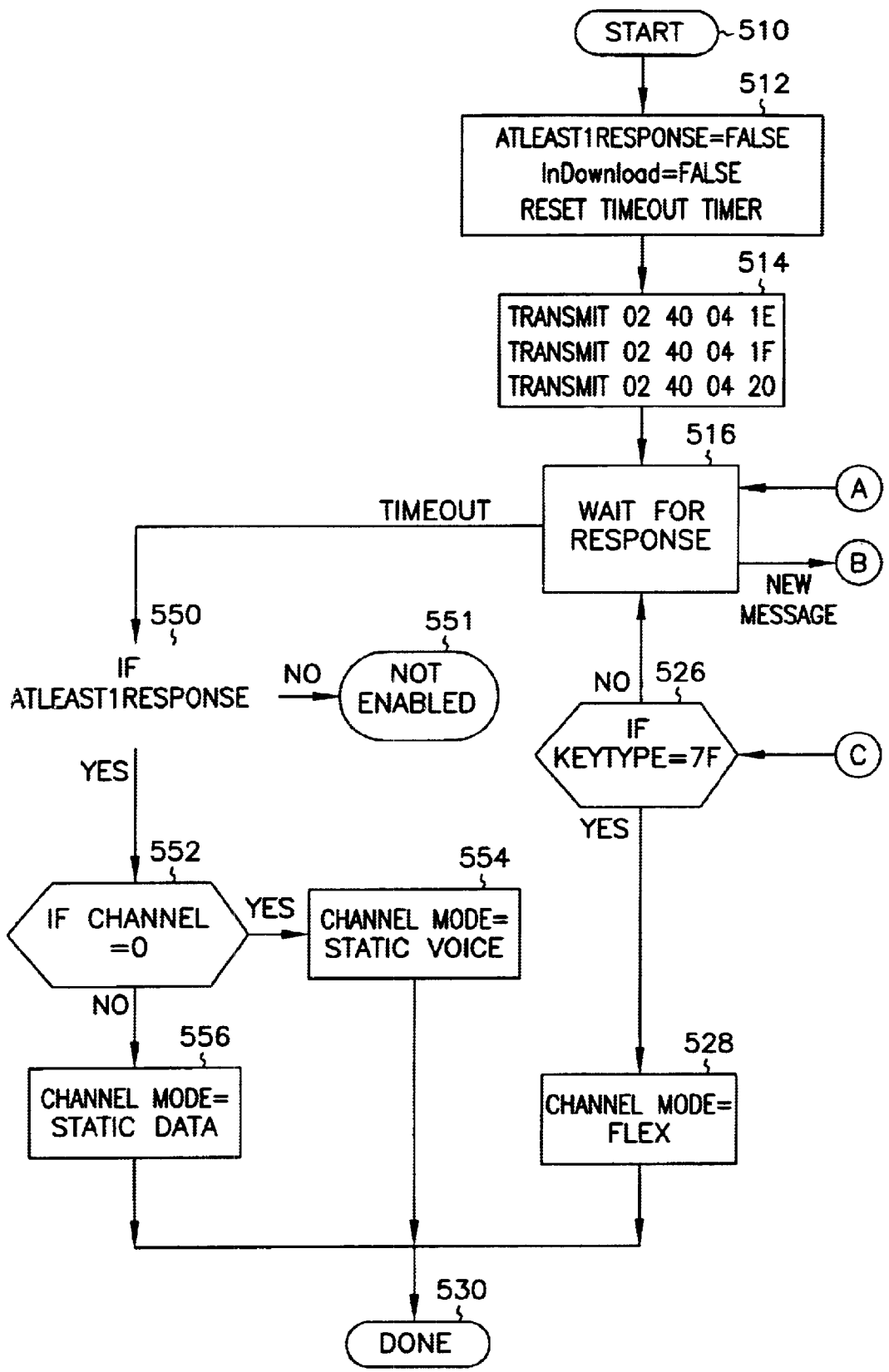
FIGS. 5A and 5B are a flow chart showing steps performed by a device of FIG. 1 to identify channel modes in a further embodiment.
Figure 5B:
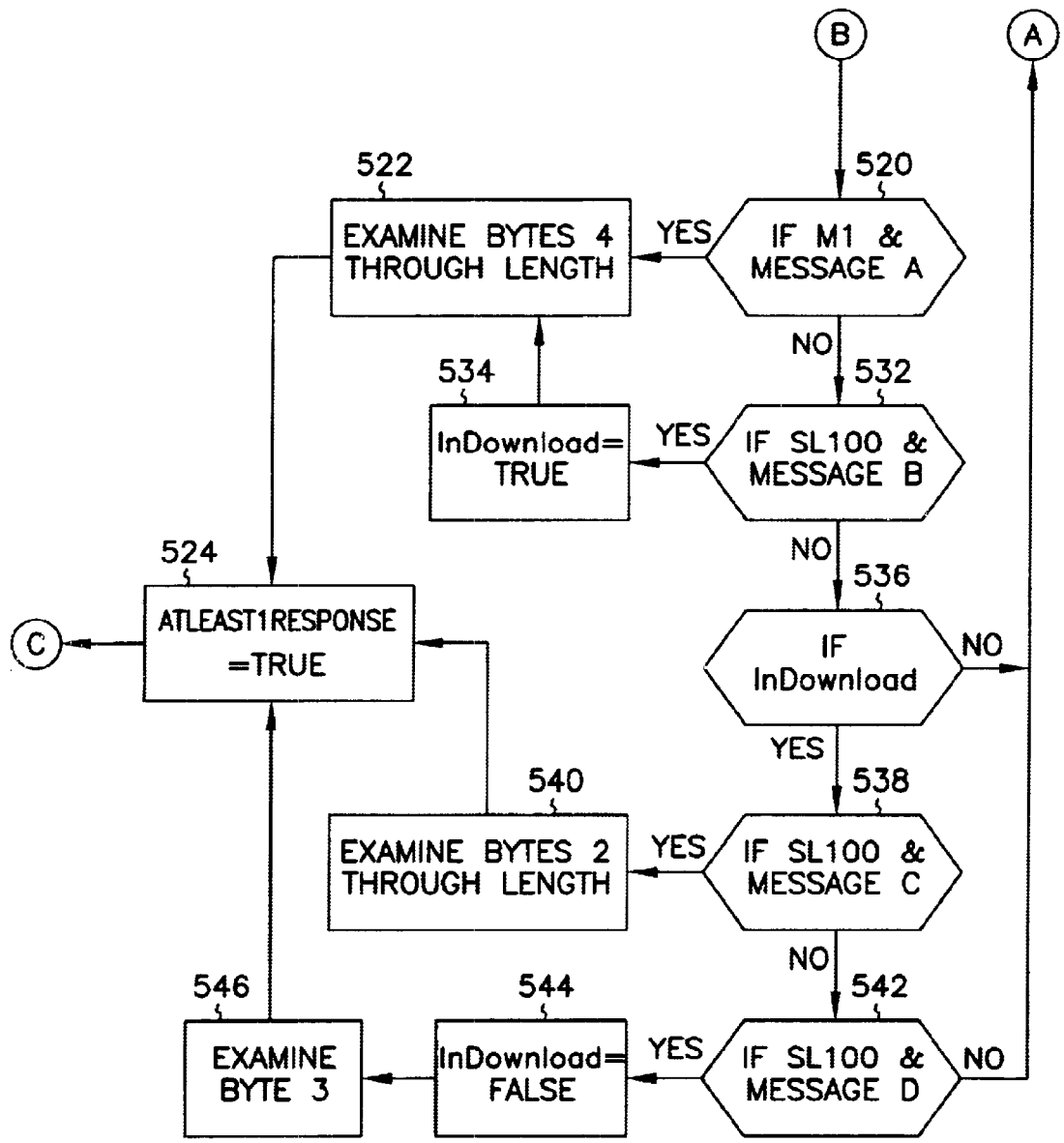

In FIGS. 5A and 5B, an alternative method of channel mode identification is started at 510. This process may be implemented in one of many ways as identified with reference to FIG. 3. At 512, a response counter is reset, and two logical values, LnDownload and AtLeast1Response are set FALSE. At 514, three messages or commands are transmitted to the switch, to ask it to respond with what keys are assigned to the device. In other words, these messages are used to determine which keys/functions can be serviced by the switch for this particular device. The functions typically are standard telephony functions, such as multiple lines, call forwarding, transfer and conference calling to name a few. The first message shown at block 514 requests the first 16 keys corresponding to a standard digital telephone, the second requests the next 22 keys corresponding to a first expansion module, and the third requests the last 22 keys that correspond to functions provided by a second expansion module. It is important that the type of switch is known at this point, because different switches will provide sub responses with different numbers of keys per subresponse. There is some house keeping to perform, in that each subresponse only contains four or five keys, and the subresponses must be combined to form a full response for each of the three requests. Following combination of the keys to be responsive to each of the individual requests, a response is waited for at 516. When received, it is compared at 520 in the context of being from switch M1. If it is from M1, and it compares to Message A as shown in FIG. 5C, bytes 4 through the length indicated in the header are examined at 522 and AtLeast1Response is set TRUE at 524. If Keytype (as indicated in FIG. 5G) is equal to hex 7F at 526, then the channel mode is set to flexible at 528 and the process is ended at 530. A flexible channel mode means that the switch supports both data and voice on a particular channel.

If the conditions at 520 were not satisfied, conditions shown in block 532 are compared to determine if the message was from a SL100 switch and if it was a message of the type Message B as represented in FIG. 5D. If so, LnDownload is set TRUE at 534 and processing continues at 522. If the conditions at 532 were not satisfied, and if LnDownload is FALSE, processing returns to 516 to wait for a further response. If LnDownload is TRUE at 536, conditions at block 538 are compared. These conditions comprise the message being sent from an SL100 switch, and being message type Message C as represented in FIG. 5E. If the conditions are met, bytes two through length are examined at 540 and processing proceeds to block 524 as previously described to determine the mode. If the conditions at block 538 were not met, conditions at block 542 comprising the message being from switch SL100 and Message D (FIG. 5F) and a DTM key identifier, as represented in FIG. 5G are checked. If not met, a response is waited for at 516 again. If met, LnDownload is set FALSE at block 544 and byte 3 of the message is examined at 546. Processing then proceeds at block 524 to determine the channel mode.

If no response is received by a predetermined time at block 516, a timeout is generated, and processing proceeds to block 550 which checks the state of AtLeast1Response. If FALSE, the device is not enabled yet at the switch as indicated at 551. At this point, a user may have to contact the telcom operator to enable the device on the switch. If AtLeast1Response is TRUE, and if the zero channel is the channel on which the message was received as indicated at block 552, then the channel mode is set to Static Voice at 554. If the message was not received on channel zero, then the channel mode is set to Static Data at block 556.

Figure 6:
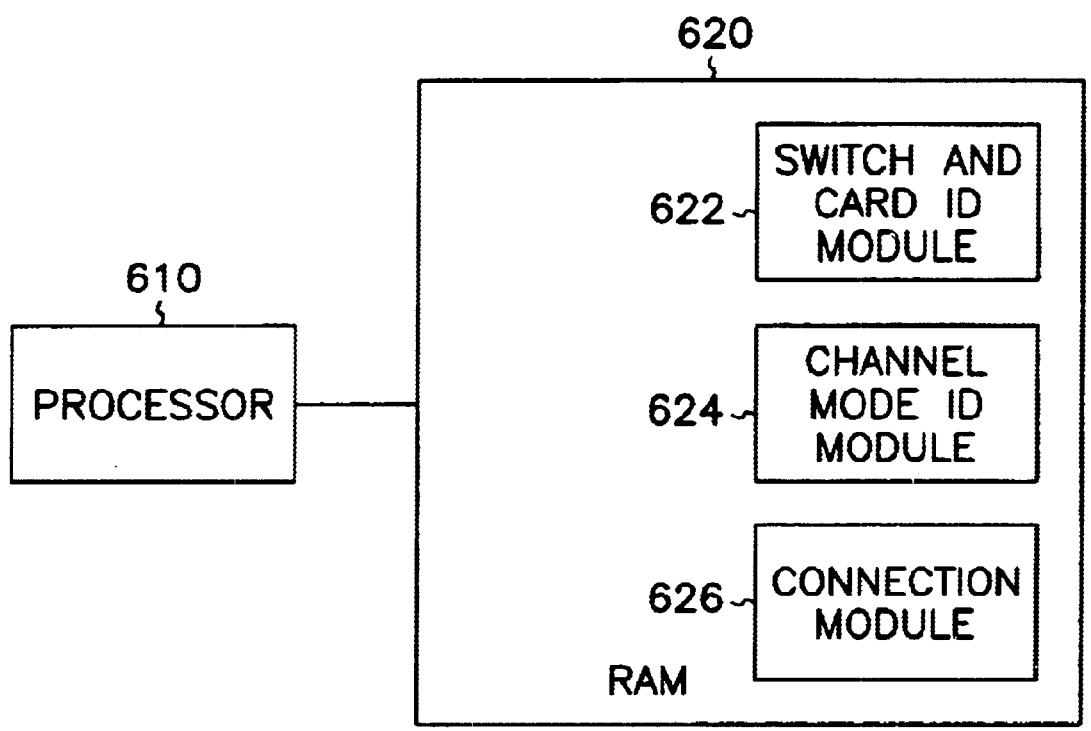
FIG. 6 is a block diagram representation of a processor and memory having program modules stored therein.

In a further embodiment, the flowcharts represented above are implemented in programming code modules as represented in FIG. 6. A processor 610 is coupled to a memory device such as a random access memory, RAM 620. The programming modules may be in object or procedural form, and comprise a switch and card identification module 622, a channel mode identification module 622, and a connection module 626 for managing the logical connection to the channels. Each of the elements of the previous flowcharts may comprise submodules, some of which may be shared between the modules identified in FIG. 6. Further modules may be easily created and changed, and the blocks in FIG. 6 are also deemed to be representative of actual hard coded functionality in ASIC type devices.

Conclusion

A device attached to an unknown combination of switch and line card is able to automatically determine the type of switch and card in spite of the fact that the combination does not provide an architected identification indication. By dissecting the polling that such combinations perform, the device is able to determine with certainty the switch type and card type. Further, the device may cycle through different processing modes when making the determination. Finally, once the switch and card type are known, the device can determine which data types are supported even though, once again, the switch is not architected to provide such information.

It is to be understood that the above description is intended to be illustrative, and not restrictive. Many other embodiments will be apparent to those of skill in the art upon reviewing the above description. For instance, the particular order and arrangement of modules and the code in which they are written may be easily varied. Similarly, function may be provided by code written in many of various commercially available languages, such as C and C++, it may also be programmed in lower level languages, or hard coded into ASICs. Still further, the protocols of the messages and requests may be easily varied for different type of switches and line cards without departing from the scope and spirit of the invention. The scope of the invention should, therefore, be determined with reference to the appended claims, along with the full scope of equivalents to which such claims are entitled.

What is claimed is:

1. A telephony device for attaching to multiple different types of line cards in different types of switches, the device comprising:
    a connection for connecting to a combination of a line card and a switch;
    a monitor that detects polling information from the line card and switch combination; and
    a comparator that detects a bit stream from the polling information and identifies the line card type and switch type based on the detected bit stream.

2. The telephony device of claim 1 wherein the polling information fails to contain an architected identifier of the switch and line card.

3. The telephony device of claim 1, wherein the device is selected from the group consisting of digital telephone and computer system.

4. A telephony device for attaching to multiple different types of line cards in different types of switches, the device comprising:
    a connection for connecting to a combination of a line card and a switch;
    a monitor that detects polling information from the line card and switch combination;
    a comparator that detects a bit stream from the polling information and identifies the line card type and switch type; and
    a flow controller that directs the polling information to different modules if a line card type and switch type is not identified from a first set of polling information.

5. The telephony device of claim 4 wherein the comparator identifies at least three different switch and line card combinations.

6. A telephony device for attaching to multiple different types of line cards in different types of switches, the device comprising:
    a connection for connecting to a combination of a line card and a switch providing at least two channels;
    a monitor that detects polling information from the line card and switch combination;
    a first comparator that detects bit streams from the polling information and identifies the line card type and switch type;
    a message module that generates a request for functionality supported by the switch for the connection; and
    a second comparator that receives responses from the switch and determines which channels of the connection support voice and which support data.

7. A telephony device for attaching to multiple different types of line cards in different types of switches, the device comprising:
    a connection for connecting to a combination of a line card and a switch providing at least two channels;
    a monitor that detects polling information from the line card and switch combination;
    a first comparator that detects bit streams from the polling information and identifies the line card type and switch type;
    a flow controller that directs the polling information to different modules if a line card type and switch type is not identified from a first set of polling information;
    a message module that generates a request for functionality supported by the switch for the connection; and
    a second comparator that receives responses from the switch and determines which channels of the connection support voice and data.

8. A method of detecting which of multiple different types of line cards in different types of switches a telephony device is coupled to, comprising the steps of:
    making a connection to an unidentified line card and switch combination;
    monitoring polling information received from the line card and switch combination; and
    comparing the polling information to expected information; and
    identifying the line card type and switch type based on the comparison.

9. The method of claim 8 wherein the polling information does not contain an architected identifier of the switch and line card.

10. A method of detecting which of multiple different types of line cards in different types of switches a telephony device is coupled to, comprising the steps of:
    making a connection to an unidentified line card and switch combination;
    monitoring a first set of polling information received from the line card and switch combination; and
    comparing the polling information to expected information; and
    identifying the line card type and switch type based on the comparison; and
    directing the polling information to different modules in the device if a line card type and switch type is not identified from the first set of polling information.

11. A method of detecting which of multiple different types of line cards in different types of switches a telephony device is coupled to, comprising the steps of:

making a connection to an unidentified line card and switch which provide at least two channels;

monitoring a first set of polling information received from the line card and switch; and comparing the polling information to expected information; and identifying the line card type and switch type based on the comparison; and directing the polling information to different modules in the device if a line card type and switch type is not identified from the first set of polling information;

generating a request for functionality supported by the sw comparing received responses from the switch to predetermined expected responses; and determining which channels of the connection support voice and data based on the compared responses.

12. A computer readable medium having instructions stored thereon for causing a suitably configured telephony device for attaching to multiple different types of line cards in different types of switches to perform the steps comprising:

making a connection to an unidentified line card and switch;

monitoring polling information received from the line card and switch;

comparing the polling information to expected information; and identifying the line card type and switch type based on the comparison.

13. A computer readable medium having instructions stored thereon for causing a suitably configured telephony device for attaching to multiple different types of line cards in different types of switches to perform the steps comprising:

making a connection to an unidentified line card and switch;

monitoring a first set of polling information received from the line card and switch; and comparing the polling information to expected information; and identifying the line card type and switch type based on the comparison; and directing the polling information to different modules in the device if a line card type and switch type is not identified from the first set of polling information.

14. A telephony device for attaching to multiple different types of line cards in different types of switches, the device comprising:

means for connecting to a combination of a line card and a switch;

means for detecting polling information from the line card and switch combination; and means for detecting a bit stream from the polling information and identifying the line card type and switch type based on the detected bit stream.

15. A telephony device for attaching to multiple different types of line cards in different types of switches, the device comprising:

means for connecting to a combination of a line card and a switch which provide at least two channels;

means for detecting polling information from the line card and switch combination;

means for detecting bit streams from the polling information and identifying the line card type and switch type;

means for generating a request for functionality supported by the switch for the device; and means for receiving responses from the switch and determining which channels provided support voice and which support data.

\* \* \* \* \*

UNITED STATES PATENT AND TRADEMARK OFFICE
CERTIFICATE OF CORRECTION

PATENT NO. : 6,633,639 B1 Page 1 of 1
DATED : October 14, 2003
INVENTOR(S) : James D. Ludford It is certified that error appears in the above-identified patent and that said Letters Patent is hereby corrected as shown below:

Column 9,
Line 16, delete "sw" and insert -- switch for the connection; -- therefor.

Signed and Sealed this

Twenty-fourth Day of February, 2004

JON W. DUDAS
*Acting Director of the United States Patent and Trademark Office*